United States Patent [19]

Buckner

[11] 3,817,669

[45] June 18, 1974

[54] APPARATUS FOR THE PREPARATION OF PLASTIC FOAM

[75] Inventor: Morgan D. Buckner, Magnolia, Ark.

[73] Assignee: The Dow Chemical Company, Midland, Mich.

[22] Filed: Feb. 20, 1973

[21] Appl. No.: 334,060

Related U.S. Application Data

[62] Division of Ser. No. 173,130, Aug. 19, 1971, Pat. No. 3,751,377.

[52] U.S. Cl.................. 425/4 C, 259/4, 264/53, 425/131, 425/205, 425/817 C
[51] Int. Cl............................................ B29d 27/02
[58] Field of Search .... 425/113, 114, 131, DIG. 16, 425/205, 462, 4, 4 C, 130, 817, 817 C; 264/171, 241, 53; 259/4; 137/599

[56] References Cited
UNITED STATES PATENTS 3,195,865   7/1965   Harder............................. 137/599
3,391,051   7/1968   Ehrenfreund....................... 425/4 C Primary Examiner—R. Spencer Annear
Assistant Examiner—Mark Rosenbaum
Attorney, Agent, or Firm—Robert B. Ingraham

[57] ABSTRACT

Thermoplastic foam is prepared by extrusion and injection of a fluid blowing agent into the heat plasified mass. The improvement is the inclusion of an interfacial surface generator; that is, motionless in-line mixer, whose mixing, under conditions of stream-line flow, can be considered independent of throughput. Foams of reduced density and increased homogeneity are obtained. Lower power is required, together with simplified equipment and reduced maintenance thereof.

4 Claims, 2 Drawing Figures

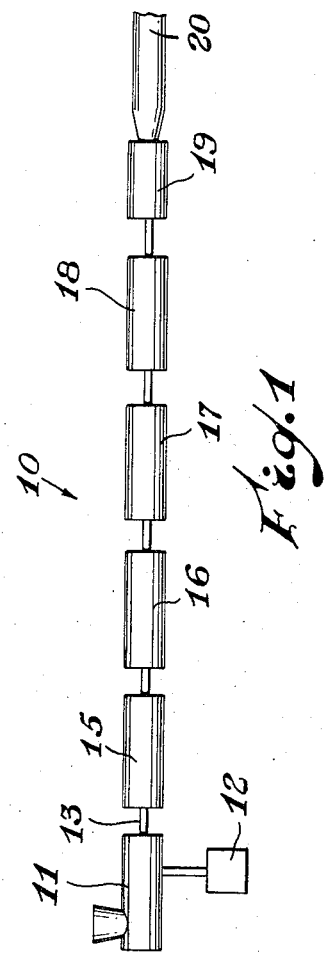
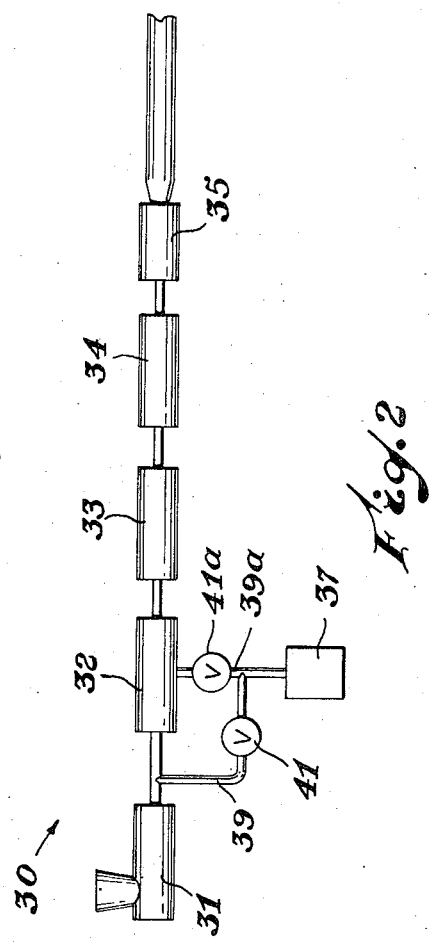

APPARATUS FOR THE PREPARATION OF PLASTIC FOAM

This application is a divisional application of my co-pending application Ser. No. 173,130, filed Aug. 19, 1971 now U.S. Pat. No. 3,751,377.

Thermoplastic foams are well known as are processes for the production thereof by the extrusion of thermoplastic materials which include a blowing or gas producing agent. One particularly desirable manner of producing such thermoplastic foams or foamable materials by an extrusion process is to provide a stream of heat plastified thermoplastic material and add or inject into the stream a volatile fluid foaming agent, the fluid foaming agent being generally a non-solvent for the polymer at the extrusion temperature, admixing the blowing agent with the heat plastified gel, bringing the gel to a desired extrusion temperature; that is, a temperature above or below the foaming temperature, depending upon whether a foamed product or a foamable product is desired. From a practical standpoint, such a process has been found to have limitations, particularly concerning the density of the foam that can be produced thereby. For example, with a given thermoplastic resin such as polystyrene, one can readily extrude a small round foamed rod, such a rod having a diameter of 1 inch to 2 inches of very low density foam. If one attempts to employ the same or similar conditions and proportions of blowing agent, feed, temperatures and the like to extrude a foam body of larger cross-section; for example, a billet 12 inches in thickness and 24 inches in width, one can be eminently unsuccessful; the product can warp, twist and distort. Often if one sections an extruded foam billet in a plane generally normal to the direction of extrusion, there are regions of varying density and varying cell size. Sometimes these occur in a radial pattern; at other times they occur in a generally transverse pattern.

A wide variety of equipment has been employed to prepare thermoplastic foams for extrusion and representative equipment is described in the following U.S. Pats. Nos. 2,669,751; 2,753,595; 2,740,157; 3,151,192 and 3,160,688. Other more complex extrusion processes are known. However, the more complex the equipment becomes usually the more difficult the maintenance and the lower the degree of reliability that can be obtained in day to day operation. Such maintenance increases rapidly as more elements with moving parts are employed and oftentimes the power requirements per unit of output is increased.

In the preparation of synthetic foams, often-times it is desirable to add various modifying materials during their preparation including finely divided materials such as calcium silicate, dyes, pigments, fire retardants and the like or other finely divided solid incompatible materials that function as nucleating agents; that is, agents which affect cell size and generally cause reduction thereof. Generally in preparing foams, in order to obtain desired nucleation and the like, minimal amounts of the additives are required. Such additives frequently are more expensive than the thermoplastic material employed to prepare the foam and it is desirable that such additives be utilized at minimal levels. Oftentimes such additives while contributing a desirable effect also will contribute one or more undesirable effects. Frequently it is beneficial to employ such additives at minimal concentration.

It would be desirable if there were available an improved method and apparatus for the preparation of synthetic resinous thermoplastic foams.

It would also be desirable if there were available an improved method and apparatus for the preparation of synthetic resinous thermoplastic foams which provided an improved product and products requiring lesser quantities of additives.

It would further be desirable if there were available a method and apparatus for the preparation of synthetic resinous foams which utilized simplified low power requirement process and apparatus.

These benefits and other advantages in accordance with the present invention are achieved in a method for the preparation of thermoplastic synthetic resinous foam wherein a volatile fluid foaming agent which is generally a non-solvent for the resin is admixed with heat plastified resin to form a flowable gel and extruded into a region of lower pressure and temperature, the improvement which comprises passing the heat plastified resin and foaming agent through an interfacial surface generator prior to extruding into a zone of lower pressure.

Also contemplated within the scope of the present invention is an apparatus for the preparation of synthetic resinous foam, the apparatus comprising in cooperative combination a source of a heat plastified synthetic resinous material, means to introduce a volatile fluid foaming agent into the heat plastified stream, an interfacial surface generator in operative communication with the source, the interfacial surface generator having an inlet end and an outlet end, the inlet end receiving the heat plastified resin, the discharge end discharging heat plastified resin and foaming agent, a die defining a discharge opening of a desired configuration, the die being in operative communication with the discharge end of the interfacial surface generator.

By the term "interfacial surface generator" is meant an inline motionless mixer, sometimes referred to as a static mixer or static pipe mixer, whose mixing mechanism is generally unrelated to the throughput when the throuhput is flowing in the region of streamline flow. Such mixers may be considered as layering mixers wherein the flowing stream is divided and two component parts reshaped and joined together in such a way that the interface between the original elements of the stream is substantially increased. Such mixers are well known in the art and some of these mixers and their mode of operation are described in the following U.S. Pats. Nos.: 3,051,542; 3,051,453; 3,195,865; 3,206,170; 3,239,197; 3,286,992; 3,328,003; 3,358,749; 3,382,534; 3,394,924; 3,404,869; 3,406,947 and 3,506,244.

Extrudable foamable polymers incorporating a volatile fluid foaming agent are well known in the art and are well known commercially. Such polymers include alkenyl aromatic resinous polymers. By the term "alkenyl aromatic resinous" is meant a solid polymer of one or more polymerizable alkenyl aromatic compounds. The polymer or copolymer comprises, in chemically combined form, at least 50 percent by weight of at least one alkenyl aromatic compound having the general formula

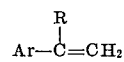

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as methylmethacrylate or acrylonitrile, etc.

Typical of such polymers are foamed polystyrene and foamable polystyrene; styrene/acrylonitrile polymers; foamed styrene/maleic anhydride polymers. Other foamable polymers include polyolefins such as foamed polyethylene; foamed polypropylene and foamed resinous copolymers of ethylene and propylene; polycaprolactam foam, foamed polymers of nylon 66, condensation product of hexamethylenediamine and adipic acid; foamed ethylene vinyl acetate copolymers; foamed polyvinyl chloride, foamed vinylidene chloride/vinyl chloride; foamed polymethylmethacrylate; foamed polyethylacrylate and the like.

The present invention is applied with particular benefit to alkenyl aromatic resinous foams such as foamed and foamable polystyrene and foamed and foamable styrene/acrylonitrile polymers as well as rubber-reinforced styrene polymers such as the impact polystyrenes and rubber-reinforced acrylonitrile/butadiene/styrene polymers.

Employing the method and apparatus of the present invention, substantially improved uniformity of the extrude is obtained whether it be extruded as a foam or as a foamable resin. For polymers in the foamed form, non-uniformities are most readily determined by judging cell size uniformity. Unfoamed polymers usually are evaluated by determining volatile or blowing agent content across a cross-section of the extrude.

Further features and advantages of the present invention will become more aparent from the following specification taken in connection with the drawing wherein:

FIG. 1 schematically depicts one embodiment of the invention and the prior art. FIG. 2 schematically depicts an alternate embodiment of the invention.

In FIG. 1 there is schematically shown a foam plastic extrusion apparatus generally designated by the reference numeral 10 which can be conveniently employed to illustrate the invention and the prior art. The apparatus 10 comprises in cooperative combination an extruder 11 which is a source of heat plastified synthetic resinous material. A volatile fluid foaming agent supply 12 is in operative combination with the extruder 11 and provides volatile fluid foaming agent to heat plastified gel within the extruder. The extruder 11 has a discharge 13 which is in operative communication with a first gel stream or foamable polymer processing unit 15. The unit 15 in turn discharges to a second processing unit 16. The unit 16 in turn discharges to a third processing unit 17 which in turn discharges to a fourth processing unit 18. The unit 18 in turn discharges to an extrusion die 19. The heat plastified gel in turn is discharged as a foamed or foamable elongate shaped body 20. The function of the first two processing units 15 and 16 usually is to provide adequate admixing of the blowing agent with the heat plastified polymer. As the blowing agent or volatile fluid foaming agent is generally a non-solvent for the polymer at extrusion temperatures, oftentimes such blowing agent incorporation is accomplished with substantial difficulty. Usually, the third and fourth processing units such as the units 17 and 18 remove heat from the heat plastified gel and bring the material to a desired extrusion temperature prior to discharge from the die.

Although four processing units are depicted in FIG. 1, the number may be more or less, depending upon the particular design of the equipment. In some instances, for example, foam extrusion is accomplished by attaching the die directly to the extruder and accomplishing the desired heating, mixing and cooling within the single piece of apparatus. However, the basic functions as depicted in FIG. 1 are retained.

One particularly beneficial manner of preparing plastic foams as set forth in the prior art is set forth in U.S. Pat. No. 2,669,751 where, in essence, the heat plastified gel containing the blowing agent is discharged to a processing unit which comprises one or more screw extruders or similar devices mounted in series to subject the gel to mixing and cooling conditions prior to extrusion from the die. Each such unit requires a drive usually consisting of an electric motor and gear reducer.

In accordance with the present invention, the gel processing train; that is, the functions equivalent to the first and second processing units 15 and 16, are readily replaced with substantial benefit by means of an interfacial surface generator; for example, interfacial surface generators as shown in U.S. Pats. Nos. 3,051,452; 3,051,453 and 3,195,865. Surprisingly, when such a replacement is made, substantially improved results are obtained. The power requirements for the extrusion train drop significantly in that the rotary mixers or extruders performing the mixing functions of the units 15 and 16 are eliminated without any significant increase in the power input required to the extruder 11. It must be appreciated, of course, that the choice of an interfacial surface generator or interfacial surface generators to install as the processing units 15 and 16 must be made with due regard to pressure drop occurring during viscous flow of the material within the line. The selection of a suitable size of interfacial surface generator for any particular polymer processing operation is well within the skill of the average designer of such equipment.

Advantageously, processing units such as the units 17 and 18 which serve to reduce the temperature of the heat plastified foamable stream to desired extrusion temperatures, may also be interfacial surface generators. Because of the layering characteristics of the interfacial surface generators, jacketing may be employed with great advantage to provide a heat exchange jacket about the exterior of the interfacial surface generator which will result in a very small temperature gradient between the various stream elements after the generation of at least, theoretically, many thousands of layers.

In FIG. 2 there is depicted an alternate embodiment of the extrusion apparatus of the present invention generally designated by the reference numeral 30. The embodiment 30 comprises in cooperative combination a source of heat plastified synthetic resinous material or an extruder 31 in operative communication with a first interfacial surface generator 32, a second interfacial surface generator 33 and a third interfacial surface generator 34, the interfacial surface generators in essence being connected in series; that is, wherein the first discharges to the second, the second to the third. The third interfacial surface generator 34 discharges to a die 35 which may be considered as generally identical to the die 19 of FIG. 1. The source of volatile fluid foaming agent 37 is in selective operative communication with the source 31 by means of the conduit 39 having disposed therein a valve 41. The source 37 is also in selective communication with the first interfacial surface generator 32 through the conduit 39a having disposed therein a valve 41a.

In the embodiment of FIG. 2, volatile fluid foaming agent may be added directly to the polymer source at the entry to the first interfacial surface generator or may be added within the interfacial surface generator; or alternately, depending upon the temperature of the source, a portion of the fluid foaming agent may be added prior to entry into the interfacial surface generator and the remaining portion subsequently added within the interfacial surface generator. The dual or multiple addition is particularly advantageous wherein relatively large quantities of blowing agent are being added to the heat plastified polymer. In the art of mixing employing interfacial surface generators, it is generally considered undesirable to utilize an interfacial surface generator with materials having widely differing viscosities due to the effect of channeling and the like.

The following examples illustrate the manner in which the principles of the invention are applied but are not to be construed ad limiting the scope of the invention.

EXAMPLE 1

Polystyrene foam is prepared employing as feed stock 100 parts by weight of polystyrene and 10 parts per 100 of a blowing agent which is a mixture of 50 parts of dichlorodifluoromethane and 50 parts of methyl chloride. A 1 ¼ inch extruder is employed as a means to heat plastify the polystyrene. The methyl chloride is introduced through a side injection port positioned adjacent the discharge end of the screw and about three-fourths of the distance between the feed port and the discharge end of the screw. The discharge of the extruder is passed to an interfacial surface generator having 28 mixing elements or stages having a flow pattern as described in U.S. Pat. No. 3,406,947. The discharge of the interfacial surface generator is in operative combination with a die of appropriate size to provide a foamed strip about one-half inch in thickness and 12 inches in width. The extruded foam obtained has a density of about 1.8 pounds per cubic foot and when sectioned shows excellent cross-sectional uniformity of cell size. For purposes of comparison, the interfacial surface generators are replaced with a second 1 ¼ inch extruder, both screws rotating at the same speed as in the original experiment employing the interfacial surface generators. A maximum of about 8 parts of blowing agent per 100 parts of polymer is the maximum amount of blowing agent which can be employed without the formation of blow holes and large irregularities in the foam. In each instance, identical polymer and blowing agent mixtures are employed and conditions optimized to obtain maximum production rates with uniform quality.

EXAMPLE 2

A polystyrene extrusion train utilizing a 2.5 inch extruder and rotary cooler similar to that depicted in U.S. Pat. No. 2,669,751 is operated to otpimize the extruded foam to provide a foam of generally uniform low density and utilize a maximum quantity of blowing agent. The blowing agent is a mixture of 60 parts by weight methyl chloride and 40 parts by weight of dichlorodifluoromethane. The operating conditions are as follows: extruder pressure — 1,420 pounds per square inch; die pressure — 670 pounds per square inch; extruder temperature — 208° C.; foaming temperature — 113° C.; 0.03 part per hundred parts of polystyrene of magnesium oxide and 0.04 parts of indigo per hundred parts of polystyrene are employed at a fixed feed rate of 100 pounds per hour of polystyrene. The maximum amount of blowing agent which can be incorporated into the extruded foam is 8 parts per hundred without producing an unsatisfactory foam. The density of the foam is 2.6 pounds per cubic foot. A 10 stage interfacial surface generator having a flow pattern as described in U.S. Pat. No. 3,406,947 is added to the extrusion train and receives polymer directly from the extruder. The extrusion conditions are then optimized to determine the maximum amount of blowing agent which can be incorporated within the polymer and provide a uniform commercially acceptable polystyrene foam employing a feed rate of 100 pounds per hour of polystyrene, together with 0.03 part per hundred parts of polystyrene of magnesium oxide and 0.01 part per hundred parts of polystyrene of indigo. Extrusion conditions are as follows: extruder pressure — 1,100 pounds per square inch; die pressure — 540 pounds per square inch; extruder temperature — 212° C.; foaming temperature — 113° C. Ten parts per hundred parts of polystyrene of the 60/40 mixture of methylchloride/dichlorodifluoromethane blowing agent are used and commercially acceptable foam is obtained having a density of 2.1 pounds per square inch.

EXAMPLE 3

A generally similar comparison is made employing a larger polystyrene foam extrusion train wherein a 10 stage interfacial surface generator having a flow pattern as described in U.S. Pat. No. 3,406,947, is inserted immediately after the extruder. A feed rate of 1,800 pounds per hour of polystyrene is employed. The blowing agent mixture is equal parts by weight of methylchloride and dichlorodifluoromethane and minor quantities of self-extinguishing and nucleating agents are employed in equal amounts in both cases. The results are set forth in the following Table:

TABLE

| Conditions | Extruder pressure [a] | Die pressure [a] | Extrude gel temperature [b] | Foaming temperature [b] | Blowing agent [c] | Foam density |
|---|---|---|---|---|---|---|
| With interfacial surface generator | 1,180 | 610 | 215 | 114 | 14.0 | 1.6 |
| Without interfacial surface generator | 1,100 | 580 | 220 | 115 | 11.5 | 2.0 |

[a] = Pounds per square inch.
[b] = ° C.
[c] = Parts per hundred.

In a manner similar to the foregoing illustrations, the hereinbefore delineated polymers and blowing agents are employed to produce uniform quality synthetic resinous foams.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An apparatus for the preparation of synthetic resinous foamable gel, the apparatus comprising in cooperative combination
   a source of heat plastified synthetic resinous material,
   means to introduce a volatile fluid foaming agent into a heat plastified stream supplied by the source,
   an interfacial surface generator in operative communication with the source, the interfacial surface generator having,
   an inlet end and
   an outlet end, the inlet end adapted to receive heat plastified resin from the source, the discharge end adapted to discharge the heat plastified resin and foaming agent,
   a die defining a discharge opening of a desired configuration, the die being in operative communication with the discharge end of the interfacial surface generator.

2. The apparatus of claim 1 including means to mechanically admix the volatile fluid foaming agent with the heat plastified stream to provide a generally uniform heat plastifiable foamable gel, said means to admix being disposed between the source and the interfacial surface generator.

3. The apparatus of claim 1 including cooling means disposed adjacent the die and adapted to remove heat from the heat plastified resin and foaming agent mixture.

4. The apparatus of claim 1 wherein the means to introduce the volatile fluid foaming agent is in communication with means to provide selective communication with a location within the interfacial surface generator and a location between the source and the interfacial surface generator.

\* \* \* \* \*